US012803013B2

(12) United States Patent
Magel

(10) Patent No.: US 12,803,013 B2
(45) Date of Patent: Nov. 17, 2026

(54) INJECTION MODULE FOR A CONVEYOR ASSEMBLY OF A FUEL CELL SYSTEM

(71) Applicant: Robert Bosch GmbH, Stuttgart (DE)

(72) Inventor: Hans-Christoph Magel, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 478 days.

(21) Appl. No.: 18/576,177

(22) PCT Filed: Jun. 7, 2022

(86) PCT No.: PCT/EP2022/065346
§ 371 (c)(1),
(2) Date: Jan. 3, 2024

(87) PCT Pub. No.: WO2023/280492
PCT Pub. Date: Jan. 12, 2023

(65) Prior Publication Data

US 2024/0313236 A1 Sep. 19, 2024

(30) Foreign Application Priority Data

Jul. 9, 2021 (DE) ..................... 10 2021 207 270.4

(51) Int. Cl.
*H01M 8/04089* (2016.01)
*F04F 5/46* (2006.01)

(52) U.S. Cl.
CPC ......... *H01M 8/04089* (2013.01); *F04F 5/461* (2013.01)

(58) Field of Classification Search
CPC .... F01F 5/461; F01F 5/30; F01F 5/34; H01M 8/04097; H01M 8/04089
See application file for complete search history.

(56) References Cited

U.S. PATENT DOCUMENTS 6,341,623 B1 * 1/2002 Channing .......... F02M 37/0047 417/189
9,368,806 B2 * 6/2016 Noh ...................... B05B 1/3013
(Continued)

FOREIGN PATENT DOCUMENTS

CN 109630479 A * 4/2019 .............. F04F 5/461
DE 102014225274 A1 12/2015
(Continued)

OTHER PUBLICATIONS

Translation of International Search Report for Application No. PCT/EP2022/065346 dated Oct. 11, 2022 (2 pages).

*Primary Examiner* — Joseph A Dillon, Jr.
(74) *Attorney, Agent, or Firm* — Michael Best & Friedrich LLP

(57) ABSTRACT

The invention relates to an injection module (2) for a conveyor assembly (1) of a fuel cell system (31) for conveying and/or recirculating a gaseous medium, in particular hydrogen, in which: the injection module (2) has a communicating opening (29) and/or an inlet opening (3), by means of which the gaseous medium flows into the injection module (2); the injection module (2) has a small nozzle body (13) having a first drive nozzle (12) and a large nozzle body (15) having a second drive nozzle (14), by means of which (12, 14) the gaseous medium flows out of the injection module (2); the small nozzle body (13) is disposed movably in the direction of a longitudinal axis (52) in the large nozzle body (8) and/or in the injection module (2); the small nozzle body (13) and the large nozzle body (15) each have a gas flow path (III, IV); the gaseous medium can flow either only through the first gas flow path III or through the first gas flow path III and the second gas flow path IV simultaneously; the second gas flow path IV can be opened or closed by means of a movement of the small nozzle body (13). According to the invention, the small nozzle body (13) abuts a stop disc
(Continued)

(30) and/or at least indirectly abuts the large nozzle body (15), and thus forms an opening pressure surface (22); the opening pressure surface (22) and a closing pressure surface (24), in particular located at the outflow end of the small nozzle body, are at least almost the same size; the opening pressure surface (22) can be subjected to a dynamic pressure (44) at the inflow end.

12 Claims, 4 Drawing Sheets

(56) References Cited

U.S. PATENT DOCUMENTS

| | | | | |
|---|---|---|---|---|
| 9,494,116 | B2 * | 11/2016 | Eisenmenger | F02M 63/0026 |
| 10,541,432 | B2 * | 1/2020 | Koyama | F04F 5/16 |
| 11,644,049 | B2 * | 5/2023 | Magel | F04F 5/16 429/444 |
| 11,682,776 | B2 * | 6/2023 | Gruenberger | F04B 49/22 429/444 |
| 2007/0163649 | A1 * | 7/2007 | Yamagishi | F04F 5/48 429/513 |
| 2008/0199746 | A1 * | 8/2008 | Kobayashi | F04F 5/16 429/430 |
| 2017/0244116 | A1 * | 8/2017 | Koyama | F16K 31/0686 |
| 2022/0102742 | A1 * | 3/2022 | Hero | F04D 23/008 |
| 2023/0204050 | A1 * | 6/2023 | Richter | F04F 5/16 429/513 |
| 2024/0186544 | A1 * | 6/2024 | Magel | F04F 5/16 |
| 2024/0363876 | A1 * | 10/2024 | Magel | H01M 8/04201 |

FOREIGN PATENT DOCUMENTS

| | | | |
|---|---|---|---|
| EP | 2242138 | A1 | 10/2010 |
| JP | 2006252863 | A | 9/2006 |

* cited by examiner

INJECTION MODULE FOR A CONVEYOR ASSEMBLY OF A FUEL CELL SYSTEM

BACKGROUND

The present invention relates to an injection module for a conveyor assembly of a fuel cell system for conveying and/or recirculating a gaseous medium, in particular hydrogen.

Fuel cells are increasingly being used as energy converters, among other things in vehicles, in order to directly convert the chemical energy contained in a fuel, e.g., hydrogen together with oxygen, into electrical energy. Fuel cells typically comprise an anode, a cathode, and an electrolytic membrane disposed between the anode and the cathode. Oxidation of the fuel occurs at the anode, and a reduction of oxygen occurs at the cathode. Water is produced on the cathode side.

Typically, the anode of fuel cells is continuously supplied with gaseous fuel in excess, that is to say, more fuel than is stoichiometrically necessary for a given supply of oxygen to the cathode. The fuel excess is typically recirculated or re-supplied to the anode, in particular an injection module for a conveyor assembly of a fuel cell system.

DE 10 2014 225 274 A1 discloses an injection module for a conveyor assembly of a fuel cell system for conveying and/or recirculating a gaseous medium, in particular hydrogen, with a dosing valve. The injection module has a communicating opening and/or an inlet opening, by means of which the gaseous medium flows into the injection module. Furthermore, the injection module comprises a small nozzle body having a first drive nozzle and a large nozzle body having a second drive nozzle, by means of which the gaseous medium flows out of the injection module, wherein the small nozzle body is disposed in the large nozzle body and/or the injection module so as to be movable in the direction of a longitudinal axis. The small nozzle body and the large nozzle body comprise a respective gas flow path III, IV, wherein the gaseous medium can flow either only through the first gas flow path III or through the first gas flow path III and the second gas flow path IV simultaneously, wherein the second gas flow path IV can be opened or closed by a movement of the small nozzle body. Both drive nozzles are also driven by a common dosing valve, wherein the second drive nozzle is connected via a spring-loaded sequence valve formed by the inner nozzle. This assembly helps to achieve a very simple and compact design of a jet pump having two nozzles and common dosing valve.

The injection module for a conveyor assembly known from DE 10 2014 225 274 A1 can have certain disadvantages.

When the dosing valve is opened, a jet pump pressure at the outflow end of the second drive nozzle builds up in the injection module, out of principle. This jet pump pressure of the second drive nozzle acts on the end faces of a small nozzle body, thereby closing the sequence valve again, in particular the gas flow path IV. Therefore, a stable activation function of the second drive nozzle does not result.

SUMMARY

According to the invention, an injection module for a conveyor assembly of a fuel cell system for conveying and/or recirculating a gaseous medium, in particular hydrogen, is proposed. The injection module has a communicating opening and/or an inlet opening, by means of which the gaseous medium flows into the injection module, wherein the injection module has a small nozzle body having a first drive nozzle and a large nozzle body having a second drive nozzle, by means of which the gaseous medium flows out of the injection module. Furthermore, the small nozzle body is disposed movably in the direction of a longitudinal axis in the large nozzle body and/or in the injection module. The small nozzle body and the large nozzle body each have a gas flow path III, IV, wherein the gaseous medium can flow either only through the first gas flow path III or through the first gas flow path III and the second gas flow path IV simultaneously, wherein the second gas flow path IV can be opened or closed by means of a movement of the small nozzle body.

The injection module is configured such that the small nozzle body abuts a stop disc and/or at least indirectly abuts the large nozzle body, and thus forms an opening pressure surface, wherein the opening pressure surface and a closing pressure surface, in particular located at the outflow end of the small nozzle body, are at least almost the same size, wherein the opening pressure surface can be subjected to a dynamic pressure at the inflow end. In this way, the advantage can be achieved that the small nozzle body moves in the direction of the stop disc and/or the large nozzle body not in the direction of the longitudinal axis and abuts the latter, such that the flow connection of the second gas flow path IV closes and thus only the first gas flow path III is perfused by the gaseous medium. When opening the sequence valve by means of movement of the small nozzle body, the jet pump pressure at the outflow end of the second drive nozzle is formed out of principle. Thus, it can be prevented that the jet pump pressure at the outflow end, which in particular acts on the closing pressure surface of the small nozzle body, results in a closing movement of the small nozzle body; rather, a stable function of such a simple construction with a concentric dual nozzle can be achieved, in which a stable, pressure-controlled opening of the sequence valve is achieved and the second gas flow path IV remains stably open even when jet pump pressure is impending, whereby the injection module can reliably deliver the hydrogen required by the operating state of a fuel cell in the required amount. Thus, a stable activation function of the second nozzle is ensured and the efficiency of the entire fuel cell system can be increased via different operating states.

According to one advantageous configuration, the small nozzle body is configured so as to be at least almost cylindrical in the direction of the longitudinal axis. A compact design of the conveyor assembly can thus be achieved.

According to a particularly advantageous development of the injection module, the sum of the end faces at the outflow end and end faces at the inflow end of the small nozzle body, not including the closing pressure surface and the opening pressure surface, are at least almost the same size. In this way, the advantage can be achieved that, upon opening the sequence valve by means of the movement of the small nozzle body and thus the opened second gas flow path IV, said second gas flow path IV can be maintained in a stable state, because the sum of the end faces at the outflow end and at the inflow end is at least almost the same size and thus, in case of an at least approximately identical dynamic pressure and jet pump pressure, a balance of forces is applied to the small nozzle body and it is thus not moved in the direction of the longitudinal axis. This leads to improved efficiency of the injection module and/or the conveyor assembly and/or the overall fuel cell system.

According to an advantageous configuration of the injection module, the small nozzle body has at least one disc-shaped guide element on its surface facing away from the longitudinal axis, by means of which the small nozzle body is guided in the large nozzle body, in particular orthogonal to the longitudinal axis. In this way, on the one hand, a quick and cost-efficient assembly can be realized by allowing the respective small nozzle body to be inserted into the large nozzle body, in particular in the direction of the longitudinal axis. Thus, the overall cost of the injection module can be reduced. On the other hand, a reliable guidance of the small nozzle body in the large nozzle body can be achieved, so that a reliable opening of the sequence valve over the entire service life of the injection module can be achieved. In this way, the reliability of the entire fuel cell system can be increased.

According to a particularly advantageous development of the injection module, the injection module comprises a spring element, wherein the spring element is located in particular in the direction of the longitudinal axis between the large nozzle body and the small nozzle body, and wherein the spring element pushes the small nozzle body against the stop disc and/or indirectly against the large nozzle body by a spring force. In this way, the advantage can be achieved that a return movement of the small nozzle body to a home position is caused by the spring element as soon as the dynamic pressure at the inflow end falls below a certain pressure level, for example in case of a low operating state and/or a low power output of the fuel cell and/or a closed dosing valve, thereby closing the second gas flow path IV. This can conserve the components needed in order to return the small nozzle body to its home position on the stop disc and/or the large nozzle body, thereby reducing the complexity of the injection module and thus reducing manufacturing and assembly costs.

According to a particularly advantageous development, the dynamic pressure in the intermediate space increases continuously when the dosing valve is open, while in particular the jet pump pressure remains at least almost the same at the outflow end of the intermediate space, until a switch pressure level is reached, at which the compressive force exerted on the opening surface exceeds the spring force and moves the small nozzle body away in the direction of the longitudinal axis, in such a way that the valve seat is lifted and a second gas flow path IV opens. In this way, the advantage can be achieved that the small nozzle body is not influenced by the jet pump pressure in a pressure chamber and has a stable opening behavior. The opening function of the sequence valve, in which the second flow path opens for perfusion, is not dependent on the jet pump pressure and/or the dynamic pressure of the second drive nozzle. A stable activation function of the second drive nozzle is thus ensured. Furthermore, a continuous adjustment of the dosing amount for pressure control in the anode system can be enabled.

According to an advantageous configuration of the injection module, the spring force of the spring element, in particular in the case of movement of the small nozzle body, does not extend linearly over the path in the event of compression or decompression of the spring element, but rather that the spring element comprises a spring constant that is progressively variable over the spring travel path. In this way, a travel distance of the small nozzle body can be configured so as to be adjustable depending on the size of the dynamic pressure, so that a maximum opening distance of the small nozzle body is only achieved at the largest possible dynamic pressure. Thus, the injection module can be designed so as to be even more adaptable to the operating conditions, thereby achieving the advantage that the efficiency of the entire conveyor assembly and/or the fuel cell system can be improved.

According to an advantageous development of the injection module, the spring element has a progressively variable spring constant, which is achieved in that the winding diameter of the closing spring is variable and/or in that the closing spring is constructed of at least two spring segments, wherein the spring segments have different spring constants. In this way, the advantage is achieved that a compact design of the injection module can be achieved.

The invention is not limited to the exemplary embodiments described herein and the aspects highlighted thereby. Rather, within the range specified by the claims, a large number of modifications are possible which lie within the abilities of a person skilled in the art.

BRIEF DESCRIPTION OF THE DRAWINGS

The invention will be described in greater detail hereinafter in reference to the drawings.

The figures show.

DETAILED DESCRIPTION

Figure 1:
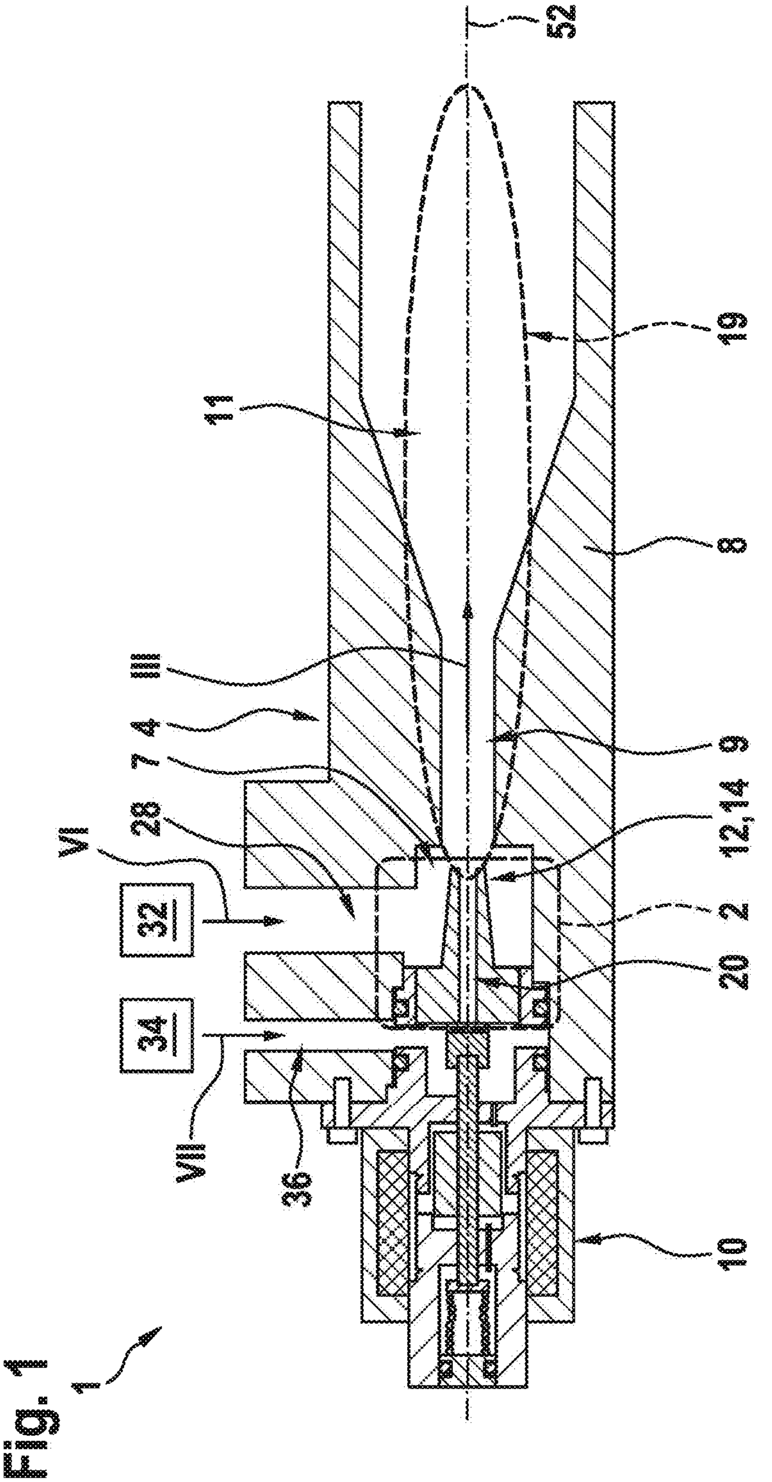
Fig. 1 PRIOR ART
FIG. 1 a schematic sectional view of a conveyor assembly with an injection module, a jet pump, and a dosing valve, FIG. 2 a schematic sectional view of the conveyor assembly with an enlarged representation of the injection module, FIG. 3 a sectional view of the injection module and the dosing valve in an enlarged view, FIG. 4 a schematic illustration of a fuel cell assembly according to the invention with a fuel cell and the conveyor assembly.

The illustration according to FIG. 1 shows a schematic sectional view of a conveyor assembly 1 with an injection module 2, a jet pump 4, and a dosing valve 10, in particular with a base body 8 of the jet pump 4.

The jet pump 4 comprises a first infeed 28, a second infeed 36, an intake region 7, the mixing tube 9, and a diffuser region 11. The dosing valve 10 comprises the second infeed 36 and a nozzle 12, 14. The dosing valve 10 is inserted into the jet pump 4, in particular in the direction of a longitudinal axis 52, in particular in an opening in the base body 8 of the jet pump 4. It is also shown in FIG. 1 that the conveyor assembly 1 is perfused by a medium to be conveyed in a flow direction III. The majority of the perfused regions of the conveyor assembly 1 are configured so as to be at least approximately tubular and serve to convey and/or direct the gaseous medium, which is in particular $H_2$ with fractions of $H_2O$ and $N_2$, in the conveyor assembly 1. The gaseous medium perfuses a central flow region 19 inside the base body 8 parallel to the longitudinal axis 52 in the flow direction III, wherein the central flow region 19 begins in the region of the mouth of nozzle 12, 14 in the intake region 7 and extends through the mixing tube 9 into the diffuser region 11 and, for example, beyond, in particular in a region with an at least almost constant diameter of a flow region of the conveyor assembly 1. One the one hand, a recirculant is supplied to the conveyor assembly 1 through the first infeed 28, wherein the recirculant is in particular the unused $H_2$ from an anode region 38 (shown in FIG. 4) of a fuel cell 32, in particular a stack, wherein the recirculant can also comprise water and nitrogen. The recirculant flows into the valve jet pump assembly 3 on a first flow path VI. On the other hand, through the second infeed 36, on a second flow path VII, a gaseous drive medium, in particular $H_2$, flows from outside the conveyor assembly 1 into an opening of the conveyor assembly 1 and/or into the base body 8 and/or the dosing valve 10, wherein the drive medium can come from a tank 34 and be under high pressure, in particular greater than 5 bar. The second infeed 36, b extends through the components of the base body 8 and/or the dosing valve 10. From the dosing valve 10, the drive medium is drained through the nozzle 12 into the intake region 7 and/or the mixing tube 9 by means of an actuator and a fully closable valve element, in particular in bursts. The $H_2$ flowing through nozzle 12, 14 and serving as a drive medium has a pressure difference and/or speed difference compared to the recirculation medium, which flows into the conveyor assembly 1 from the first infeed 28, wherein the drive medium in particular has a higher pressure of at least 5 bar. When a so-called jet pump effect occurs, the recirculation medium is conveyed at a low pressure into the central flow region 19 of the conveyor assembly 1, at a high speed, which can be in particular close to the speed of sound, through the nozzle 12, 14 into the central flow region 19 of the intake region 7 and/or the mixing tube 9. The nozzle 12, 14 has an internal recess in the form of a flow cross-section through which the gaseous medium can flow, in particular from the dosing valve 10 and into the intake region 7 and/or the mixing tube 9. The drive medium meets the recirculation medium, which is already in the central flow region 19 of the intake region 7 and/or the mixing tube 9. Due to the high speed and/or pressure difference between the drive medium and the recirculation medium, an internal friction and turbulence between the media is generated. This results in a shear stress in the boundary layer between the fast drive medium and the substantially slower recirculation medium. This stress causes pulse transmission, wherein the recirculation medium is accelerated and entrained. The mixture occurs according to the principle of conservation of momentum. The recirculation medium is accelerated in the flow direction III, and a pressure drop is generated for the recirculation medium, whereby a suction effect occurs and thus further recirculation medium is subsequently conveyed from the region of the first infeed 28. This effect can be referred to as the jet pump effect. By actuating the dosing of the drive medium by means of the dosing valve 10, a conveyance rate of the recirculation medium can be regulated and adjusted to the particular needs of an entire fuel cell system 31 (shown in FIG. 4) depending on the operating state and operating requirements. After passing through the mixing tube 9, the mixed medium to be conveyed, which consists in particular of the recirculation medium and the drive medium, flows in the flow direction III into the diffuser region 11, wherein a reduction of the flow rate can occur in the diffuser region 11. From there, for example, the medium flows further into the anode region 38 of the fuel cell 32.

Furthermore, the conveyor assembly 1 of FIG. 1 has technical features that additionally improve the jet pump effect and conveyance efficiency and/or further improve the cold start operation and/or manufacturing and assembly costs. The diffuser region 11 section is conical in the region of its internal flow cross-section, in particular increasing in the flow direction III. This shape of the diffuser region 11 section can produce the advantageous effect that the kinetic energy is converted into pressurized energy, which can further increase the possible conveyance volume of the conveyor assembly 1, as a result of which more of the medium to be conveyed, in particular $H_2$, can be supplied to the fuel cell 32, which can increase the efficiency of the entire fuel cell system 31.

According to the present invention, the dosing valve 10 can be configured as a proportional valve 10 in order to enable an improved dosing function and a more precise dosing of the drive medium into the intake region 7 and/or the mixing tube 9. To further improve the flow geometry and efficiency of the conveyor assembly 1, the nozzles 12, 14 and the mixing tube 9 are designed rotationally symmetrically, wherein the nozzle 12, 14 extends coaxially to the mixing tube 9 of the jet pump 4 and can have at least one inner flow opening 20.

Figure 2:
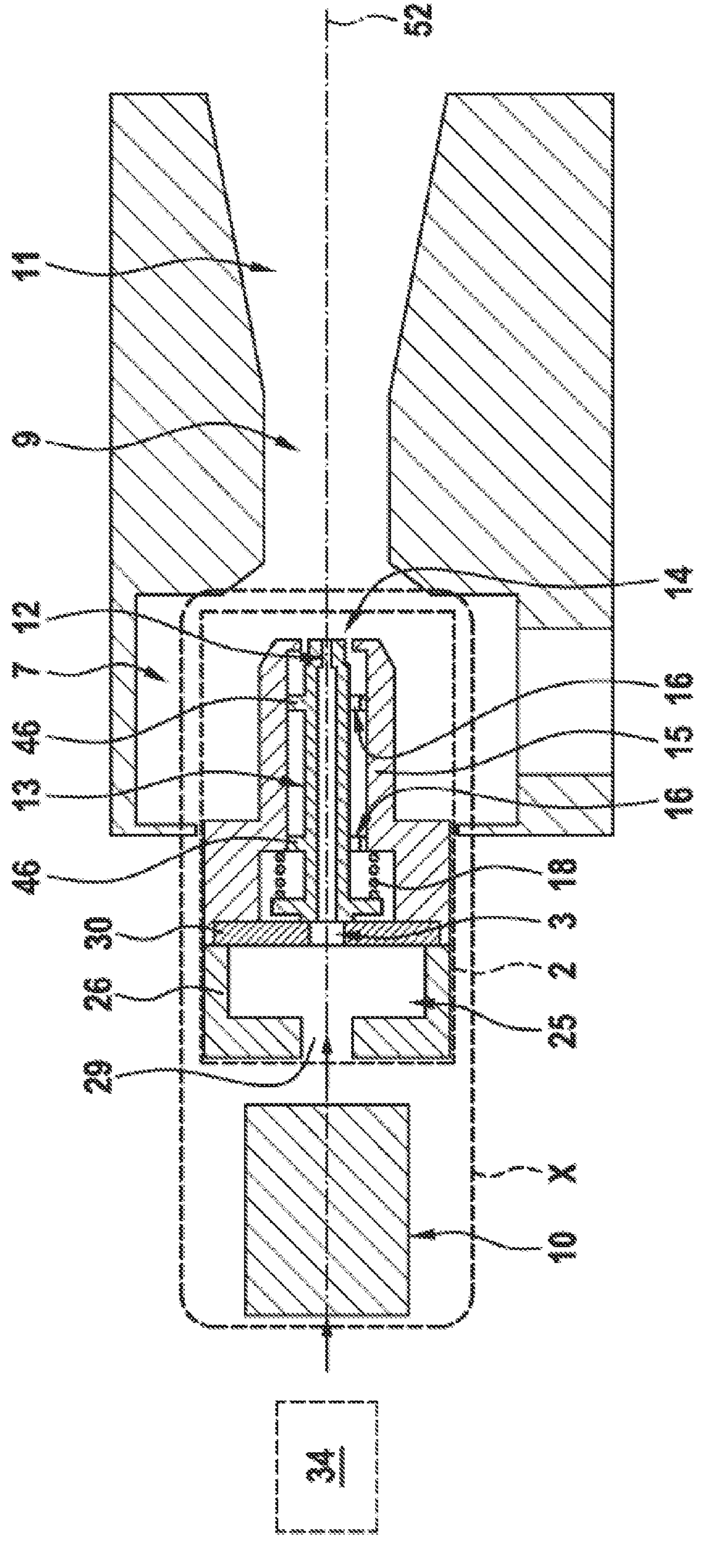

FIG. 2 shows a schematic sectional view of the conveyor assembly 1 with an enlarged representation of the injection module 2. The injection module 2 is suitable for the conveyor assembly 1 of the fuel cell system 31 for conveying and/or recirculating a gaseous medium, in particular hydrogen. The injection module 2 has a communicating opening 29 and/or an inlet opening 3, by means of which the gaseous medium flows into the injection module 2, wherein the injection module 2 has a small nozzle body 13 having a first drive nozzle 12 and a large nozzle body 15 having a second drive nozzle 14, by means of which 12, 14 the gaseous medium flows out of the injection module 2. The small nozzle body 13 is disposed movably in the direction of the longitudinal axis 52 in the large nozzle body 15 and/or in the injection module 2.

Furthermore, it is shown that the injection module 2 comprises a spring element 18, wherein the spring element 18 is located in particular in the direction of the longitudinal axis 52 between the large nozzle body 15 and the small nozzle body 13, and wherein the spring element 18 pushes the small nozzle body 13 against the stop disc 30 and/or indirectly against the large nozzle body 15 by a spring force.

In addition, it is shown in FIG. 2 that the small nozzle body 13 has at least one disc-shaped guide element 46 on its surface facing away from the longitudinal axis 52, by means of which the small nozzle body 13 is guided in the large nozzle body 15, in particular orthogonal to the longitudinal axis 52. The at least one disc-shaped guide element 46 can comprise at least one flow opening 16, which is configured as bore 16, for example, and which perfuses the guide element 46 at least almost parallel to the longitudinal axis 52. In the exemplary embodiment of the injection module 2 shown in FIG. 2, the small nozzle body 13 comprises two disc-shaped guide elements 46.

Furthermore, it is shown in FIG. 2 that the gaseous medium serving as the drive medium flows from the tank 34 in which it is under high pressure, for example at least almost 700 bar, to the dosing valve 10.

FIG. 2 shows that the injection module 2 is inserted into the base body 8 of the conveyor assembly 1, in particular in the direction of the longitudinal axis 52. The injection module 2 abuts the base body 8, for example with the large nozzle body 15, in particular orthogonal to the axis of rotation 52. The large nozzle body 15 on the side facing the dosing valve 10 has the communicating opening 29, by means of which the pressurized gaseous medium flows into an intermediate space 25 in the large nozzle body 15. On its side facing the dosing valve 10, the intermediate space 25 of the large nozzle body 15 is at least partially limited by a housing floor 26, which in turn comprises the communicating opening 29. On its side facing away from the dosing valve 10, the intermediate space 25 can be at least partially limited by the stop disc 30, wherein the stop disc 30 in turn comprises the communicating opening 29. On its side facing away from the dosing valve 10, the large nozzle body 15 comprises the second drive nozzle 14, wherein the second drive nozzle 14 projects into the intake region 7 and/or the mixing tube 9 of the base body 8.

Figure 3:
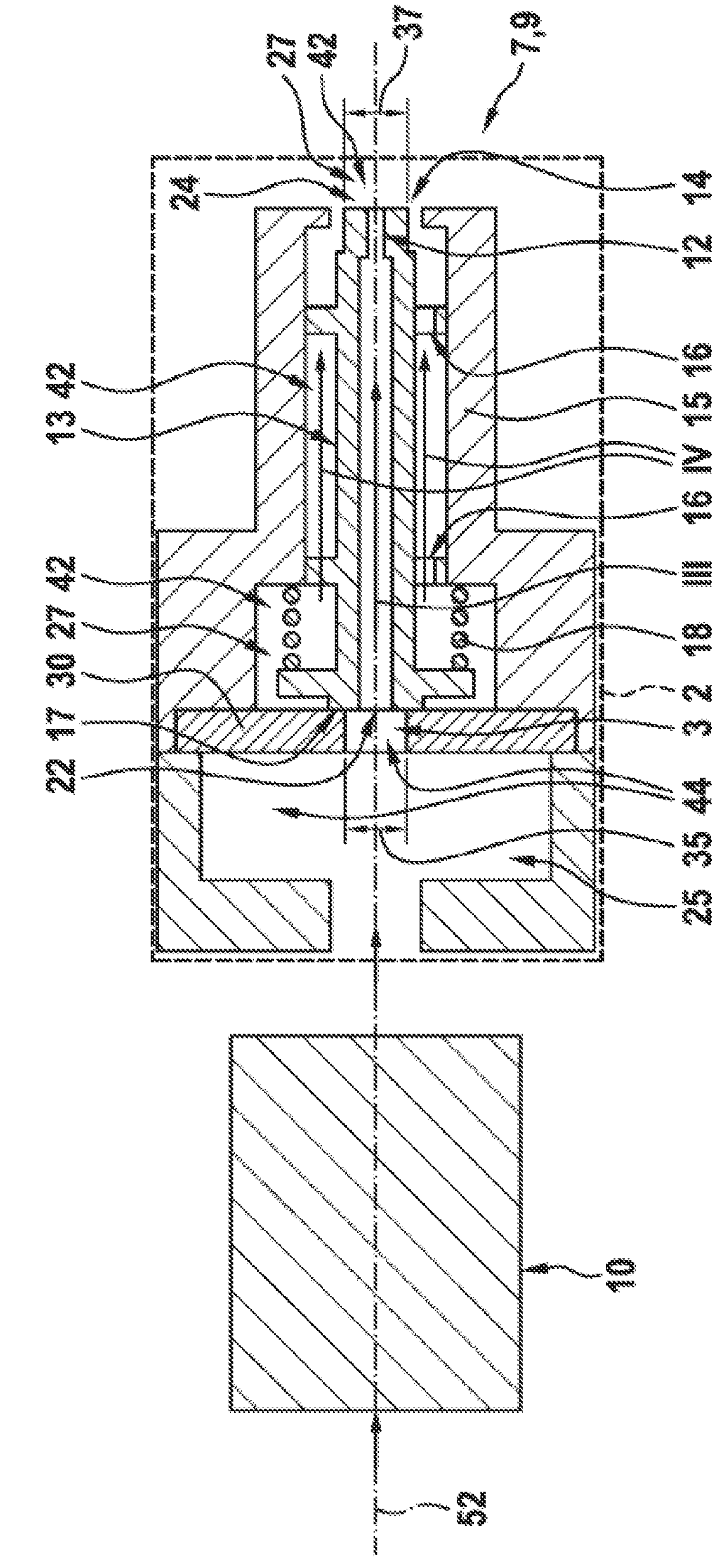

In FIG. 3, a sectional view of the injection module 2 and dosing valve 10 is shown in an enlarged view. The gaseous medium is dosed to the injection module 2 by means of the dosing valve 10, in particular into the intermediate space 25. The injection module 2 consists of the following components: large nozzle body 15, small nozzle body 13, spring element 18, and optional stop disc 30. The components are disposed rotationally symmetrically about the longitudinal axis 52. The spring element 18 is supported in the direction of the longitudinal axis 52 on a disc-shaped molding of the small nozzle body 13 and the large nozzle body 15 such that it pushes the small nozzle body 13 and/or the injection module 2 and/or the sequence valve into a closed position. In this closed position, the small nozzle body 13 with its end face facing the intermediate space 25 forms a valve seat 17 with the large nozzle body 15 and/or the intermediate disc 30.

It is further shown in FIG. 2 that the injection module 2 and/or the small nozzle body 13 and/or the large nozzle body 15 each have a first and/or second gas flow path III, IV, wherein the gaseous medium can flow either only through the first gas flow path III or through the first gas flow path III and the second gas flow path IV simultaneously. The second gas flow path IV can be opened or closed by means of a movement of the small nozzle body 13. In a home position, the small nozzle body 13 at least indirectly abuts the large nozzle body 15 or the stop disc 30 and thus forms an opening pressure surface 22. The opening pressure surface 22 and a closing pressure surface 24 are at least almost the same size, wherein the closing pressure surface 24 can be subjected to a jet pump pressure 42 at the outflow end and the opening pressure surface 22 can be subjected to a dynamic pressure 44 at the inflow end. By sliding the small nozzle body 13 in the large nozzle body 15 in the direction of the longitudinal axis 52, the arrangement of the first drive nozzle 12 in the direction of the second drive nozzle 14 can be changed such that the geometrical shape and/or contour of the drive jet can be changed in the region of the first and second drive nozzles 12, 14 of the gaseous medium, in particular in the direction of the longitudinal axis 52, upon entry into the intake region 7 and/or the mixing tube 9. Due to the inventive design of the injection module 2, the pressure surfaces 22, 24 are almost the same size, so that no resulting pressure surface exists in at least one of the pressure regions in the pressure chamber 27. This is achieved by the fact that a diameter 35 of the valve seat 17 corresponds to an outer diameter 37 of the small nozzle body 13 at the outlet of the first drive nozzle 12 in the intake region 7 or in the region of the mixing tube 9. The small nozzle body 13 is therefore not influenced by dynamic pressure 42 in a pressure chamber and has a stable opening behavior.

By means of the inlet opening 3, the gaseous medium can flow from the intermediate space 25 in which the dynamic pressure 44 is present through the inlet opening 3 to the opening pressure surface 22. From there, when the sequence valve is closed, in which case the small nozzle body 13 abuts the stop disc 30 or the large nozzle body 15 in the direction of the longitudinal axis 52 and forms the valve seat 17, the gaseous medium flows only through the first gas flow path III and from there through the first drive nozzle 12. In this case, the dynamic pressure 44 in the intermediate space 25 increases continuously when the dosing valve 10 is open, while in particular the jet pump pressure 42 remains at least nearly the same at the outflow end of the intermediate space 25 in the region of the pressure chamber 27, until a switch pressure level is reached, at which the compressive force exerted on the opening surface 22 exceeds the spring force and moves the small nozzle body 13 away in the direction of the longitudinal axis 52, in such a way that the valve seat 17 is lifted and a second gas flow path IV opens.

When the sequence valve is opened, in which case the small nozzle body 13 has moved away from the stop disc 30 or the large nozzle body 15 in the direction of the longitudinal axis 52 and thus releases the second gas flow path IV, the gaseous medium flows through the first gas flow path III and the second gas flow path IV. The first gas flow path III opens into the first drive nozzle 12 and the second gas flow path IV opens into the first drive nozzle 12. The first gas flow path III extends through a bore running along the longitudinal axis 52 inside the small nozzle body 13. The second gas flow path IV extends through the annular pressure chamber 27 extending in the direction of the longitudinal axis 52 between the small nozzle body 13 and the large nozzle body 15, wherein the pressure chamber 27 can have a stepped profile.

Furthermore, it is shown in FIG. 3 that the sum of the resulting pressure surfaces at the outflow end and the resulting pressure surfaces at the inflow end of the small nozzle body 13, not including the closing pressure surface 24 and the opening pressure surface 22, are at least almost the same size. Furthermore, the small nozzle body 13 is configured so as to be at least almost cylindrical in the direction of the longitudinal axis 52, wherein the small nozzle body 13 has surfaces that extend at least almost exclusively parallel or at least almost orthogonal to the longitudinal axis 52, and thus has no oblique surfaces on which a pressure level is applied due to the jet pump pressure 42 and/or dynamic pressure 44. Due to these inventive configurations of the injection module 2, it is thus prevented that an unforeseen movement of the small nozzle body 13 during pressure fluctuations of the jet pump pressure 42 or the dynamic pressure 44 results due to these end faces, not including the pressure surfaces 22, 24. The disc-shaped guide element 46 comprises at least one bore extending at least almost parallel to the longitudinal axis 52 so that the gaseous medium can flow in the direction of the second gas flow path IV.

In the spring element 18 shown in FIG. 3, the spring force of the spring element 18, in particular in the case of movement of the small nozzle body 13, does not extend linearly over the path in the event of compression or decompression of the spring element 18, but rather the spring element 18 comprises a spring constant that is progressively variable over the spring travel path. The progressively variable spring constant of the spring element 18 is achieved in that the winding diameter of the closing spring 18 is variable and/or in that the closing spring 18 is constructed of at least two spring segments, wherein the spring segments have different spring constants.

Figure 4:
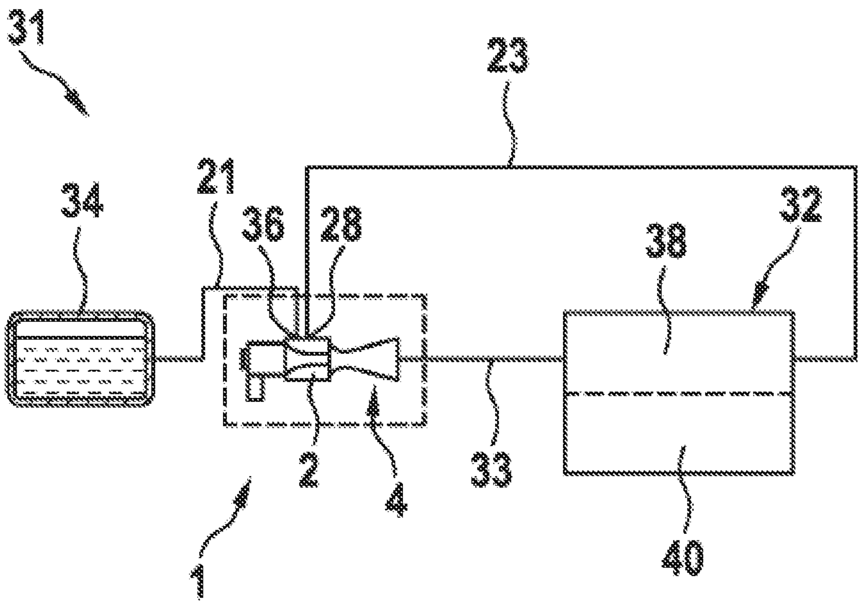

In FIG. 4, an exemplary embodiment of the fuel cell system 31, in particular an anode circuit, is shown. It is shown that the conveyor assembly 1 is connected to the fuel cell 32 via a connecting line 33, which comprises the anode region 38 and a cathode region 40. In addition, a return line 23 is provided that connects the anode region 38 of the fuel cell 32 to the first infeed 28, and thus in particular to the intake region 7, of the conveyor assembly 1. By means of the return line 23, the first gaseous medium not used up in the anode region 38 during operation of the fuel cell 32 can be returned to the first infeed 28. This first gaseous medium is in particular the recirculation medium described above.

As can further be seen from FIG. 4, the second gaseous medium stored in the tank 34 is supplied via an infeed line 21 to an infeed region, which is in particular configured as the second infeed 36, of the conveyor assembly 1 and/or the jet pump 4. This second gaseous medium is in particular the drive medium.

The invention claimed is:

1. An injection module (2) for a conveyor assembly (1) of a fuel cell system (31) for conveying and/or recirculating a gaseous medium, wherein the injection module (2) has a communicating opening (29) and/or an inlet opening (3), by which the gaseous medium flows into the injection module (2), wherein the injection module (2) has a small nozzle body (13) having a first drive nozzle (12) and a large nozzle body (15) having a second drive nozzle (14), by which drive nozzles (12, 14) the gaseous medium flows out of the injection module (2), wherein the small nozzle body (13) is disposed movably in a direction of a longitudinal axis (52) in the large nozzle body (15) and in the injection module (2) and wherein the small nozzle body (13) and the large nozzle body (15) each have a gas flow path (III, IV), wherein the gaseous medium can flow either only through a first gas flow path III of the small nozzle body (13) or through the first gas flow path III of the small nozzle body (13) and a second gas flow path IV of the large nozzle body (15) simultaneously, wherein the second gas flow path IV can be opened or closed by a movement of the small nozzle body (13), wherein the small nozzle body (13) selectively abuts a stop disc (30) and abuts the large nozzle body (15), and thus forms an opening pressure surface (22), wherein the opening pressure surface (22) and a closing pressure surface (24) are the same size, wherein the opening pressure surface (22) can be subjected to a dynamic pressure (44) at an inflow end.

2. The injection module (2) according to claim 1, wherein the small nozzle body (13) is configured to be cylindrical in the direction of the longitudinal axis (52), wherein the small nozzle body (13) has surfaces that extend parallel or orthogonal to the longitudinal axis (52).

3. The injection module (2) according to claim 2, wherein a sum of end face surfaces at an outflow end and the end face surfaces at the inflow end of the small nozzle body (13), not including the closing pressure surface (24) and the opening pressure surface (22), are the same size.

4. The injection module (2) according to claim 1, wherein the small nozzle body (13) has at least one disc-shaped guide element (46) on its surface facing away from the longitudinal axis (52), by which the small nozzle body (13) is guided in the large nozzle body (15).

5. The injection module (2) according to claim 1, wherein the injection module (2) comprises a spring element (18), wherein the spring element (18) is located between the large nozzle body (15) and the small nozzle body (13), and wherein the spring element (18) pushes the small nozzle body (13) against the stop disc (30) and/or indirectly against the large nozzle body (15) by a spring force.

6. The injection module (2) according to claim 5, wherein the dynamic pressure (44) in an intermediate space (25) increases continuously when a dosing valve (10) is open, while a jet pump pressure (42) remains the same at an outflow end of the intermediate space (25), until a switch pressure level is reached, at which a compressive force exerted on the opening pressure surface (22) exceeds the spring force and moves the small nozzle body (13) away in the direction of the longitudinal axis (52), in such a way that a valve seat (17) is lifted and a second gas flow path IV opens.

7. The injection module (2) according to claim 5, wherein the spring force of the spring element (18) does not extend linearly over a spring travel path in the event of compression or decompression of the spring element (18), but rather that the spring element (18) comprises a spring constant that is progressively variable over the spring travel path.

8. The injection module (2) according to claim 7, wherein the progressively variable spring constant of the spring element (18) is achieved in that a winding diameter of the spring element (18) is variable and/or the spring element (18) is constructed of at least two spring segments, wherein the spring segments have different spring constants.

9. The injection module (2) according to claim 1, wherein the gaseous medium is hydrogen.

10. The injection module (2) according to claim 1, wherein the closing pressure surface (24) is located at an outflow end of the small nozzle body (13).

11. The injection module (2) according to claim 4, wherein the small nozzle body (13) is guided in the large nozzle body (15) orthogonal to the longitudinal axis (52).

12. The injection module (2) according to claim 5, wherein the spring element extends in the direction of the longitudinal axis (52).

* * * * *